Jan. 6, 1942.  A. R. HOFFMANN  2,269,106
INTERNAL COMBUSTION MOTOR
Filed March 23, 1938  2 Sheets-Sheet 2
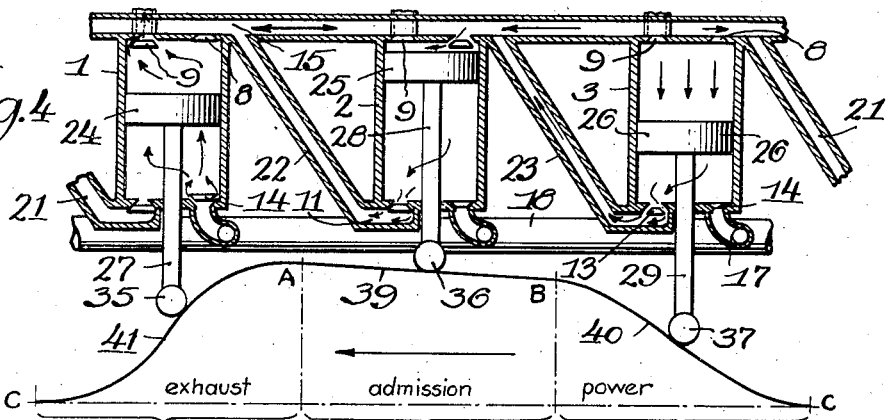
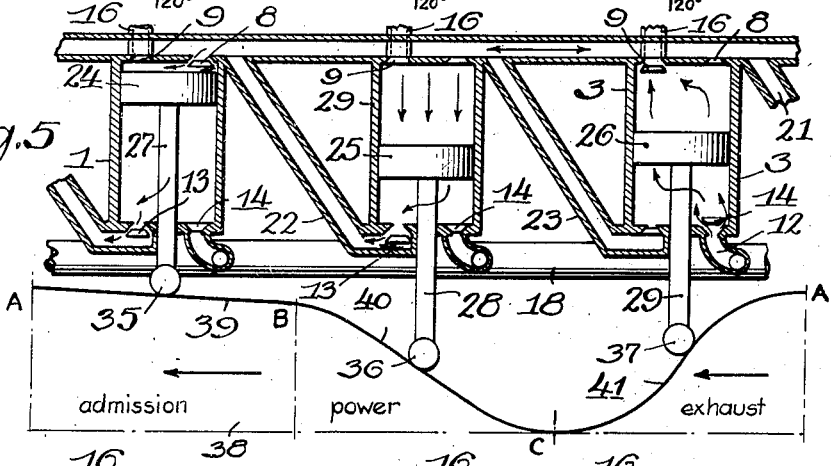
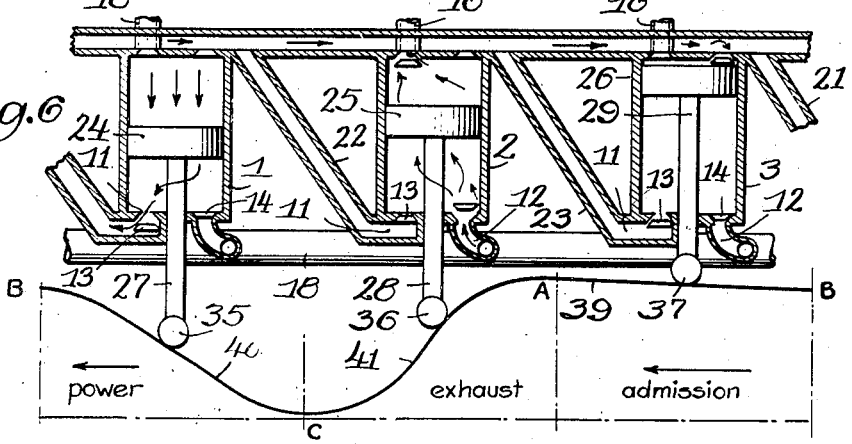
INVENTOR.
Anton R. Hoffmann,
BY Louis A. Bisson,
ATTORNEY.
Witness:
Chas. R. Kowals Patented Jan. 6, 1942

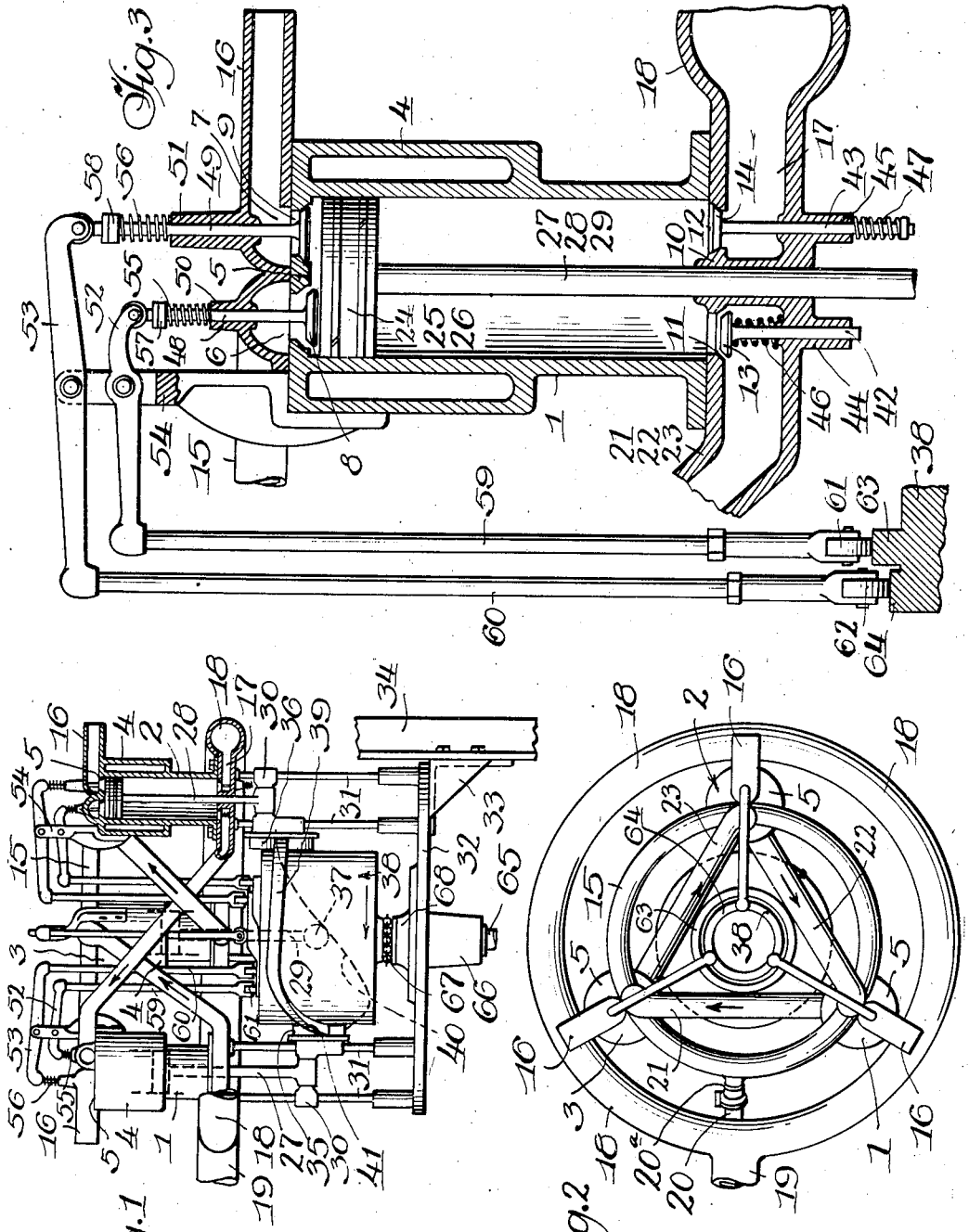

2,269,106

UNITED STATES PATENT OFFICE 2,269,106

INTERNAL COMBUSTION MOTOR

Anton R. Hoffmann, Chicago, Ill.

Application March 23, 1938, Serial No. 197,663

6 Claims. (Cl. 123—58)

The present invention relates to internal combustion motors and refers more particularly to the type for directly translating linear motion to rotary motion and also of the two-stroke cycle type.

Among the objects of the invention is to provide a novel motor or engine which is a variable stroke, two-stroke cycle, transfer compression, piston scavenging, internal combustion motor. It is so designed that the phases of fuel charge, power, and compression will occur during one stroke and the exhausting and pre-compression intake of the fuel will occur during the other stroke of the cycle.

In a specific embodiment selected to illustrate the invention, the motor comprises a set of three cylinders which are arranged in an endless series and which are so connected that, when one of the pistons is moving (as upward, as shown) to exhaust the burned gases above the piston and to draw in a charge of fuel beneath the piston, another (as the second or next piston) is taking in a compressed transferred charge at the top of the cylinder and above the piston, and the drawn in charge under the piston is beginning to be compressed, and still another piston (as the third piston) is moving downwardly in its power stroke phase under the exploded fuel above the piston and is compressing the fuel charge beneath the piston and transferring the compressed fuel to the next cylinder at the top thereof and above the piston in such next cylinder.

Another feature of the invention is the provision of a novel cam with a track or race so designed as to directly convert the linear movements of the pistons and piston rods to a rotary motion of the cam which is fixed to the drive shaft. Also the cam race or track is so designed that on the down stroke of each piston there is first a slow movement of the piston during which time the admission valve is open to admit a charge of compressed fuel above the piston, this slow movement enduring for about one-third of the revolution of the cam when the cam is designed for one complete rotation for each cycle of operation of the engine, or for about one-sixth of the revolution of the cam when the cam is designed to make one complete revolution for each two cycles of operation of the engine, and then the down stroke of the piston is more rapid to perform its part of the power stroke, the firing occurring at the start of the rapid down movement of the piston. The power stroke portion occurs for about one-third or one-sixth of a revolution of the cam depending upon whether the cam is designed for a 360° or a 180° rotation per cycle of operation of the motor. The complete up stroke of the piston is effected for the remaining cyclic part of the cam track or race.

Another object of the invention is to provide a novel engine so designed as to completely exhaust or scavenge the burned gases or products of combustion. This is effected by having the piston on its exhaust stroke travel completely to the top of the cylinder, that is, to the top dead center as close as is mechanically possible to the top wall of the cylinder. This affords a positive piston scavenging of the gases with a controlled exhaust valve so that there is practically a one hundred per cent volumetric efficiency in the expelling of the products of combustion.

Preferably the device is designed to feed the fuel under pressure to a common header or manifold connected to the respective cylinders, although the invention is not limited to this form of device. The feed may be independently connected to each of the cylinders of the series. The use of a common header or manifold allows for changing the compression pressures for the engine while at the same time providing for a regulation of the pressure by a suitable regulating valve or similar device on the common header whereby the feed may pass back the surplus to the intake manifold. This is particularly advantageous in the case where the fuel used is of the kind which is a mixture of the fuel and a supporter of combustion, such as gasoline and air. In the case where the fuel is injected into the combustion chamber, such as in a Diesel, oil, or similar engine, then the surplus compressed air feed to the engine may be discharged in the atmosphere as desired, but it may be returned to the intake manifold where it may be useful to supply heat to the air in the air supply manifold.

While a cylindrical type of cam means is shown by way of illustration, and the cylinders are arranged along parallel axes parallel to the axis of the cam means, the invention comprehends the disposing of the cylinders radially along radial axes in a plane and with the piston rods acting against the edge of a flat disk-like cam means disposed in the plane of the axes of the cylinders, or the disposing of the cylinders, as in groups of three, six, etc., vertically and in line and with three, six, etc. radial cams, similar to the usual type of present automobile engine. The controlling part of the cam means, such as the race or track, follows principally the curve for the type of strokes to produce the desired relative movements of the various pistons in proper timed relation. The same cam means or separate and independent cam means may be used to control the time and action of the valves, particularly the fuel admission valve and the exhaust valve of each cylinder. Although automatically operative check valves may be used in the fuel passages to the fuel compressing end of the cylinders, the invention comprehends the idea of using means for positively operating such valves when desired to produce higher volumetric efficiency.

The fuel admission valves are so located in the heads of the cylinders as to admit the gases being transferred from the compressing ends of the cylinders, such as from the preceding cylinder of the series to the power end of the succeeding cylinder, even when using a common manifold, when in effect the transfer is the same because of the timing of the opening of the valve of the succeeding cylinder. When a common manifold is not used, this valve may be automatic, such as a check valve.

Although the cam action is disclosed to operate on given angular phases, such as 120° for the cam means making one revolution per cycle, or 60° for the cam means making one-half revolution per cycle, it may be varied slightly within certain limits as may be determined by experimenting to effect the desired operation of the engine, such as to increase the efficiency (economy) or to increase the torque. As for example, the fuel admission phase may be increased or decreased a few degrees from 120° while correspondingly decreasing or increasing the power phase a few degrees. Normally the exhaust phase would remain about 120° but that could also be varied, such as if it were desired to start the piston on its exhaust stroke early to give the products of combustion an additional or initial pressure for a more rapid exhaust when the exhaust valve is open. While the cam means is shown as designed so that each cylinder will deliver one power stroke per revolution of the cam means, the invention comprehends the so designing of the cam means as to effect delivery of two or more power strokes per revolution of the cam and with corresponding changes in the angular phases as explained above.

The form or curves of the cam track or race may also be varied to meet the results desired or needed. As for example, the slopes may be of greater or less degree according to the mechanical stresses impressed upon the working parts of the motor for various types of services which the motor is expected to perform and to which the motor may be more suitably applied. The curves may be varied in accordance with the various fuels used so that the acceleration of the piston on the power stroke will scientifically conform to the rate of combustion of the fuel used. It may also be so designed that the cam will provide for a movement of the piston as will favor an adiabatic or isothermal burning of the fuel as may be desired or determined for the particular service to which the motor is to be applied.

The invention is also designed to have a volumetric displacement beneath the piston (where the piston rod may be large in diameter) so related to the volumetric displacement above the piston so that the ratio will be less than unity, or, in other words, the same may be designed to have a volumetric ratio such that the expanding gases above the piston will be as near atmospheric pressure as possible when the piston has reached the lower end of its power stroke. With a given character of fuel being compressed beneath the piston, the smaller volume of such compressed fuel will bear such a relation to the volume and pressure of fuel admitted above the piston of the next cylinder as to result in the substantially atmospheric pressure of the burned gases at the end of the power stroke mentioned above.

With these conditions, the invention has the advantage of making use of a relatively short stroke, that is, a relatively large diameter piston with a very short stroke may be used. In this way there will be much less radiating surface of the cylinder relative to the volume of fuel enclosed.

Heretofore it has been the aim of engine builders to attain as nearly as has been possible and practicable a ratio of the bore to the stroke of 1:1 (that is, diameter of bore the same as the stroke). It is also the aim of this invention, by a different means, to attain as nearly as possible such a ratio. It is even possible in this invention to go further so as to obtain, practically, a larger bore than the stroke. The advantages gained are to obtain an expansion of the gases to as nearly atmospheric pressure as possible at the end of the power stroke and to so expand the gases as to convert all of their heat energy to work in a short stroke.

Because of a lesser area below the piston, the energy required to compress the fuel below the piston to the desired degree will be small in comparison with the total energy produced above the piston.

An object of the invention is the development of a new cycle of events in the operation of an internal combustion motor and to successfully accomplish the purposes mentioned above.

Other objects, capabilities, advantages, features, and the like are comprehended by the invention as will later appear and as are inherently possessed by the invention.

Referring to the drawings:

Fig. 1 is a view in side elevation, with parts in section, of an illustrative embodiment of the invention;

Fig. 2 is a top plan view of the same;

Fig. 3 is a fragmentary elevational and part sectional view of a cylinder and the valve operating means, shown on an enlarged scale; and Figs. 4, 5 and 6 are diagrammatic views of the invention showing the different phases of operation and the relation of the phases.

Referring more in detail to the drawings, the embodiment chosen to illustrate the invention comprises a series of three cylinders 1, 2 and 3, preferably disposed in triangular arrangement and with their axes parallel to each other. Each cylinder has a cooling jacket 4 (see Fig. 3), a head 5 provided with an admission port 6, and an exhaust port 7 respectively controlled by valves 8 and 9. Each cylinder has at its lower or inner end a wall 10 provided with fuel outlet and inlet ports 11 and 12 controlled by valves 13 and 14 respectively.

To the heads of the cylinders 1, 2 and 3 is connected a common header or manifold 15 communicating with the admission ports 6 of the cylinders. Also connected to each cylinder head is an exhaust duct 16 communicating with the exhaust port 7, and which may discharge into the atmosphere or into a suitable muffler (not shown). To the lower ends of the cylinders are connected fuel supply ducts 17 communicating with the inlet ports 12, the ducts 17 leading from a common header or manifold 18 having a fuel supply inlet duct 19. This manifold may serve as a supercharger chamber for the engine when desired to operate the engine under supercharged conditions. Between the headers or manifolds 15 and 18 may be connected a surplus return duct 20 for feeding back the surplus fuel in the header 15. This duct has a pressure regulating or differential valve 20ª of any suitable type.

Also connected to the lower ends of the cylinders are fuel transfer ducts 21, 22 and 23 for transferring the compressed fuel supply from the lower or inner end of one cylinder to the top or outer end of the next cylinder of the series. These transfer ducts respectively lead from the lower ends of cylinders 1, 2 and 3 to the tops of cylinders 3, 1 and 2, respectively, the upper ends of the transfer ducts being connected, preferably, with the common manifold 15 at the loci of connection of this common manifold with the upper ends or heads of the cylinders 3, 1 and 2, respectively, although the connection may be made independently of the header, the latter being omitted if desired. While these transfer ducts 21, 22 and 23 have been shown as running directly from the lower end of a preceding cylinder in the series to the upper end of the succeeding cylinder of the series, it will be understood that the transfer ducts may extend and be connected to the common header or manifold 15 at any desired points or loci, as for example, they may extend upwardly along the side of the cylinder from the lower end of which the duct leads and be connected to the manifold adjacent the top of said cylinder.

Respectively within the cylinders 1, 2 and 3 reciprocate pistons 24, 25 and 26 rigidly connected to piston rods 27, 28 and 29 slidable in the lower walls 10 of the cylinders. The lower ends of the piston rods are connected to cross heads 30 slidable on guide rods 31 secured at their upper ends to the lower heads of the cylinders and at their lower ends to a support 32 fixed to brackets 33 secured to the engine frame 34 (fragmentarily shown).

To the cross heads 30 are rotatably connected pairs of cam rollers 35, 36 and 37, one roller of each pair riding on the top surface of the cam track of a cam 38, and the other riding against the under surface of such track. The cam 38 translates the reciprocatory or linear motion of the pistons and piston rods directly to rotary motion.

The cam shown is designed to effect a cylce of operation of the engine during one revolution of the cam. It has a cam track or race having three principal cam segments 39, 40 and 41. The segment 39 has a slight slope or small pitch and extends substantially 120° between the points A and B. It controls the movement of the piston in part of its down or in stroke at the time of the admission of compressed fuel in the head of the cylinder, the movement being slow and for a minor portion of the whole stroke of the piston. The segment 40 is of steeper slope or greater pitch and extends between the points B and C also substantially 120° apart, so that the remainder and larger portion of the down or in stroke is made by the piston moving rapidly during such 120° angular movement of the cam. This is the power stroke and the force is translated to rotary motion of the cam by way of this sloping part of the cam track. If a greater torque is desired, this slope may be made steeper and within an angular range of less than 120°. The segment 41 is still steeper or of still greater pitch and extends between the points C and A and acts to move the piston in its exhaust or out stroke for the full length of the stroke during the angular range of the cam of substantially 120°. The piston is moved entirely to the top of the cylinder so that all of the gases are positively expelled or exhausted, the top of the piston being adjacent the inner face of the cylinder head when the piston is at its top dead center, the cam rollers being at the point A of the cam track.

While the cam track segments have been mentioned as being for 120°, it is to be understood that the invention comprehends making the segments of greater or lesser angular extent. As for example, the cam segment 39 between the points A and B may be greater than 120° to allow for the time lag of ignition of the various fuels that may be used. As for example, if the engine is being used as an oil engine or a Diesel engine, the time lag of ignition of the injected oil may be such that the firing would not efficiently occur within the 120° range for admission of the compressed air. This angular range will be varied in accordance with the type of fuel used and the time lag of ignition of such fuel. On the other hand, it might be necessary to increase this angular range when the engine is operated at high speed in order to compensate for the lag of the movement of the fuel charge and with the time lag of ignition mentioned.

Figs. 4, 5 and 6 show diagrammatically the phase relations of the pistons, etc., during each cycle of operation. In Fig. 4 the piston 24 in cylinder 1 is moved in its exhaust stroke, moving rapidly upwardly. At the same time fuel is being drawn in from the supply duct 17 and manifold 18, inlet valve 14 being open. The piston 25 in cylinder 2 has passed its top dead center and is moving downward slightly in accordance with the slight slope of the cam track segment 39, the admission valve 8 being open to admit the fuel under pressure. At the same time the piston is beginning to compress the fuel beneath the piston, the valve 14 now being closed and valve 13 opening. The piston 26 in cylinder 3 is moving down rapidly in its power stroke, the fuel having been fired. At the same time the fuel beneath the piston is being rapidly compressed as the piston is rapidly descending, and is being transferred under pressure by way of the transfer duct 23 to the manifold 15 and at the top of cylinder 2 where the compressed fuel is admitted into the latter cylinder.

Fig. 5 shows the further stage of operation wherein the piston 24 in cylinder 1 has completed its exhausting function, has reached and passed top dead center, and is now moving down slowly to admit a charge of fuel under pressure, valve 8 being open for the purpose. In cylinder 2 the charge has fired and the piston 25 is now moving down rapidly in its power stroke, while at the same time rapidly compressing the fuel beneath the piston and transferring it by way of transfer duct 22 to the manifold 15 at the top of cylinder 1. In cylinder 3 the piston 26 is moving rapidly upward in its exhaust stroke and is drawing in fuel from the fuel supply.

In Fig. 6 is shown the next stage of the cycle. The charge in cylinder 1 has fired and the piston 24 is moving down rapidly in its power stroke and to rapidly compress the fuel beneath it and to transfer the fuel by way of transfer duct 21 to the manifold 15 at the top of cylinder 3. In cylinder 2 the piston 25 is moving rapidly upwardly in its exhaust stroke and is drawing in fuel from the fuel supply. In cylinder 3 the piston 26 has passed top dead center and is moving down slightly to admit a charge of compressed fuel by way of the open valve 8, and is also starting to compress the fuel beneath the piston.

It will be noted that in the down stroke of the piston the fuel charge is admitted, the fuel is fired and delivers power, and the fuel for the next cylinder is compressed and transferred under pressure to the next cylinder, all of which events occur in this particular stroke, the piston moving at different rates of speed along different portions of the stroke. In the up stroke of the piston the gases (products of combustion) are exhausted (completely) and fuel from the fuel supply is drawn in preparatory to being delivered or transferred to the next cylinder of the series. Hence, all of the events of each cycle occur within these two strokes, the pistons having different rates of speed of movement at any given instant of time.

The valves 13 and 14 (at the lower end of the cylinder) as shown in Fig. 3 are of the check valve type and respectively have stems 42 and 43 slidable in hubs 44 and 45, the stems having exteriorly extending portions with springs 46 and 47 so connected to the stems 42 and 43 as to resiliently and yieldingly resist the opening of the valves 13 and 14, but, if desired, these valves may be positively operated by any suitable mechanism in any desired timed relation.

The admission and exhaust valves 8 and 9, respectively, have stems 48 and 49 slidable in hubs 50 and 51, and are pivotally connected at their upper ends to rocker arms 52 and 53, rockably mounted on a post 54 fixed to the upper end of the cylinder. Springs 55 and 56 are interposed between the hubs 50 and 51 and collars 57 and 58 fixed to the stems 48 and 49, respectively, to close and normally hold closed the valves 8 and 9. To the other ends of the rocker arms 52 and 53 are pivotally connected cam operated rods 59 and 60 having at their lower ends cam rollers 61 and 62 adapted to ride on cams 63 and 64 on the upper edge or rim of the cam 38, and also to ride on the edge or rim of this cam 38. The cams 63 and 64 are of such height and of such length as to properly open the valves 8 and 9 and to hold them open for the desired or required interval of time.

The cam 38 is fixed to a driving shaft 65 rotatably mounted in a bearing 66, there being a suitable thrust ball bearing 67 between the cam 38 and the hub plate 68 fixed to the support 32 and the bearing 66 (see Fig. 1).

When operating the engine with an explosive mixture such as gasoline and air, the cycle of events is as follows: (1) As the piston moves slowly away from the top dead center to form a combustion chamber, the intake valve opens and the explosive mixture is admitted under pressure, which gradually rises until it reaches a predetermined maximum pressure (determined by the compression ratio of the engine); (2) At this point the admission valve closes and ignition occurs and the piston moves down rapidly in its power stroke to the bottom dead center; and (3) At the bottom dead center the exhaust valve opens and remains open until the piston has travelled to the very top of the cylinder at the top dead center position, thereby positively displacing all of the products of combustion and thus completing the cycle. Contemporaneously with the above events other events also occur, namely, fuel from the fuel supply is compressed beneath the piston and is transferred during the admission and power stroke portions of the piston, and during the exhaust stroke of the piston fuel is drawn in from the fuel supply into the cylinder beneath the piston, the valves at the lower end of the cylinder operating accordingly.

When the engine operates as an oil engine wherein air is compressed in place of a fuel supply and the fuel (such as oil) is forcibly injected, the events are as follows: (1) The same as (1) above except for the fact that air alone is admitted in the upper end of the cylinder; (2) Injection of the fuel then occurs, the event being otherwise the same as (2) above; and (3) This event being the same as (3) above.

The present invention has the following features:

(a) The cylinders are sealed at the top and bottom in much the same manner as in a double acting steam engine type of cylinder;

(b) It takes at least three cylinders to operate the engine;

(c) More cylinders may be used but they should be in multiples of three for the best operation;

(d) The intake air or explosive mixture manifold is connected to the bottom of each cylinder where the charge is drawn into the cylinder during the up stroke of the piston to top dead center;

(e) During the down stroke of the piston to bottom dead center, this charge is compressed and admitted to the top of the next cylinder of the series, where the piston is moving relatively slowly downwardly to form the combustion chamber, by way of the compression transfer manifold;

(f) The compression is caused by a relative difference in piston speeds between the transferring cylinders; and (g) This is accomplished by means of a special cam which times these events and regulates the length of stroke and the relative piston speeds in such a manner that the events of this particular cycle are carried out in proper order.

The present invention is not limited to the particular form of cam shown but other forms may be used. As for example, if the cylinders were to be disposed along radial axes in a plane, a flat cam with the proper edge contour also disposed in that plane could be used. The cam may be designed with any number of lobes to give any desired number of power impulses per revolution. The form of the lobes may be in accordance with the particular service the engine is to perform, or for the purpose of obtaining the greatest possible efficiency. The design of the cam may follow the combustion rates of the particular fuels used. Specially shaped cams may be advantageously used for certain fuels where it is desired to obtain the maximum thermodynamic efficiency. As for example, the cam may be so designed as to control the operation whereby the burning of the fuel in the cylinders may be effected to any desired degree toward either adiabatic or isothermal combustion of the fuel, as by controlling the rate of speed with which the piston falls away at the time of ignition.

In operation, and referring to Fig. 4, when the piston in cylinder 1 is in its exhausting stroke it creates a vacuum beneath it and the fuel supply check valve 14 is opened to admit the fuel (in case of operating on an explosive mixture) or air (in case of operating as an oil engine) into the cylinder beneath the piston. After the piston has reached its top dead center and has completely exhausted the products of combustion above the piston, the piston moves downwardly at a slow rate. At this instant the valve 14 is closed, automatically, and the admission valve 8 is mechanically opened to admit compressed fluid from the manifold to which the fluid had been previously transferred. At the same time the piston is beginning to compress the fluid beneath the piston and to open the valve 13 for transferring the compressed fluid to the next cylinder of the series.

When the piston has travelled down sufficiently, the valve 8 is mechanically closed and the charge in the cylinder above the piston is fired. The piston then travels down rapidly in its power stroke and also rapidly compresses the charge in the cylinder beneath the piston, fully opening the valve 13 and transferring the compressed charge to the next piston in the order of firing.

When the piston has reached the end of its power stroke, that is, at its bottom dead center, the cam segment 41 then rapidly moves the piston upwardly in its exhaust stroke as explained above.

While I have herein described and upon the drawings shown an illustrative embodiment of the invention, it is to be understood that the invention is not limited thereto but comprehends other constructions, arrangements of parts, details, features and the like without departing from the spirit of the invention.

Having thus disclosed the invention, I claim as my invention:

1. In an internal combustion engine comprising a cylinder having admission and exhaust valves at one end thereof and fluid inlet and outlet valves at the other end thereof, a fluid supply means connected to said inlet valve, a fluid transfer duct connected to said outlet valve and to said admission valve, a piston reciprocable in said cylinder, a driving shaft, the combination therewith of a cam operatively connected to said shaft and to said piston for converting the reciprocatory motion of said piston to rotary motion of the shaft and cam, said cam having an approximately one-third portion thereof provided with a track of slight slope for controlling the movement of the piston for a fractional portion of a stroke thereof and during about one-third of the cycle of operation, and having another approximately one-third portion thereof provided with a track of greater slope for controlling the movement of the piston at a greater speed for the remainder of said stroke of the piston and during about another one-third of the cycle of operation, and a further approximately one-third portion thereof provided with a track for controlling the movement of the piston for the whole of the opposite stroke of the piston and during approximately the remaining one-third of the cycle of operation, and cam operated means for opening the admission valve in time relation to the movement of the piston during the first mentioned portion of the stroke thereof.

2. In an internal combustion engine comprising a cylinder having admission and exhaust valves at one end thereof and fluid inlet and outlet valves at the other end thereof, a fluid supply means connected to said inlet valve, a fluid transfer duct connected to said outlet valve and to said admission valve, a piston reciprocable in said cylinder, a driving shaft, the combination therewith of a cam operatively connected to said shaft and to said piston for converting the reciprocatory motion of said piston to rotary motion of the shaft and cam, said cam having about a third portion thereof provided with a cam track segment of small pitch for giving the piston a slow movement for a minor portion of its in stroke for receiving a charge of fuel under pressure in the cylinder above the piston during about one-third of the cycle of operation, cam operated means for operating the admission valve during said stroke portion of the piston, said cam having about another third portion thereof provided with a cam track segment of greater pitch for affording a rapid movement of the piston for the remainder and major portion of said stroke of the piston during which the power is delivered and during about another one-third of the cycle of operation, and about a further third portion thereof provided with another cam track segment having a great pitch for effecting a full out stroke of the piston for exhausting the products of combustion and during approximately the remaining one-third of the cycle of operation, and cam operated means for operating the exhaust valve during said exhaust stroke of the piston.

3. In an internal combustion engine comprising a series of three cylinders disposed in triangular arrangement and having inner and outer end walls, pistons reciprocable in said cylinders and having piston rods slidable through said inner walls, the combination therewith of said outer walls having admission and exhaust valves, said inner walls having inlet and outlet valves for controlling passage of fuel to and from said cylinders on the inner sides of the pistons, a fuel manifold having ducts connected to said inlet valves for supply of fuel to said cylinders when said pistons move in their exhaust strokes, fuel transfer ducts connected to said outlet valves and to said admission valves serially from the outlet valve of a cylinder to the admission valve of the next cylinder of the series for transferring fuel under pressure from the preceding cylinder of the series as the piston therein compresses the fuel in its power stroke, a shaft, a cam operatively connected to said shaft and to said piston rods for converting the reciprocatory motions of said pistons and piston rods to rotary motion of said cam and shaft, said cam having cam segments of different slopes, one of said segments having a slight slope for giving each piston in succession a slow movement in the first part of its in stroke for receiving a charge of compressed fuel, and another cam segment of greater slope for affording a rapid movement of the piston for the remainder of its in stroke for the delivery of power, and a further cam segment of great slope for effecting a rapid movement of the piston in its out stroke for exhausting the products of combustion, said cam having cam portions for operating said admission and exhaust valves in given time relation.

4. In an internal combustion engine of the two-stroke cycle and rear compression type comprising a series of cylinders each having admission and exhaust valves and cam operated means for operating said valves in given time relation, a shaft, a cam operatively connected to the shaft and to the pistons of the cylinders for converting the reciprocatory motions of the pistons to rotary motion of the cam and shaft, the combination therewith of said cam having a cam track so constructed and arranged as to have a given angular movement for each cycle of operation of the engine, the cam track having segments each substantially a third of the cyclic range of the track for effecting different rates of speed of movements of the pistons in their various strokes, one of said segments having a small slope, another a steeper slope, and a third segment having a still steeper slope, the first and second segments mentioned being arranged in contiguity for the first segment to first effect a slow movement of each piston for a part of a stroke thereof and for the second segment to then effect a rapid movement of the piston for the remainder of said stroke thereof, and said third segment being so arranged as to effect a rapid movement of the piston in its opposite stroke.

5. In an internal combustion engine of the character disclosed and which has a series of cylinders with pistons and wherein each cylinder has cam operated admission and exhaust valves and wherein each piston is operatively connected to a shaft with means for converting reciprocatory movements of the pistons to rotary action of the shaft; the combination therewith of said admission and exhaust valves being connected to the head end of the cylinders to control the fuel at the head side of the pistons, fluid inlet and outlet valves connected to the other end of the cylinders for controlling fluid at the other side of the pistons, a fluid transfer duct connected to the outlet valve of a cylinder and to the admission valve of the next cylinder of the series for transfer of fluid under pressure, cam means operatively connected to the shaft for controlling the pistons and comprising a cam portion with a small slope for controlling the movement of the pistons through a minor portion of the in-stroke thereof at a given slow rate of stroke speed for admission of fluid under pressure at the head side of the pistons, another cam portion with a steeper slope for controlling the further movement of the pistons through a major and remaining portion of the in-stroke thereof at a greater rate of stroke speed for power operation under the force of the ignited fuel on the head side of the piston and to compress the fluid admitted at the other side of the pistons, and a still further cam portion with a steep slope for controlling the movement of the pistons through the whole extent of the out-stroke thereof, said exhaust valves acting for discharging spent gases during said out-stroke of the pistons, and said admission valves acting for admitting fluid under pressure during said minor portion of said in-stroke of the pistons.

6. In an internal combustion engine of the character disclosed and which has a series of cylinders with pistons and wherein each cylinder has cam operated admission and exhaust valves and wherein each piston is operatively connected to a shaft with means for converting reciprocatory movements of the pistons to rotary action of the shaft; the combination therewith of said admission and exhaust valves being connected to the head end of the cylinders to control the fuel at the head side of the pistons, fluid inlet and outlet valves connected to the other end of the cylinders for controlling fluid at the other side of the pistons, a compressed fluid manifold connected to said admission valves, a fluid transfer duct connected to said outlet valves and to said fluid manifold for transfer of fluid under pressure, a fluid supply manifold connected to said inlet valves, a surplus fluid connection between said manifolds and having a regulating valve for returning surplus fluid of a given pressure to the fluid supply manifold, cam means operatively connected to the shaft for controlling the pistons and comprising a cam portion with a small slope for controlling the movement of the pistons through a minor portion of the in-stroke thereof at a given slow rate of stroke speed for admission of fluid under pressure at the head side of the pistons, another cam portion with a steeper slope for controlling the further movement of the pistons through a major and remaining portion of the in-stroke thereof at a greater rate of stroke speed for power operation under the force of the ignited fuel on the head side of the piston and to compress the fluid admitted at the other side of the piston, and a still further cam portion on the steep slope for controlling the movement of the pistons through the whole extent of the out-stroke thereof, said exhaust valves acting for discharging spent gases during said out-stroke of the pistons, and said admission valves acting for admitting fluid under pressure during said minor portion of said in-stroke of the pistons.

ANTON R. HOFFMANN.